(12) United States Patent
Bahnsen et al.

(10) Patent No.: US 12,385,750 B2
(45) Date of Patent: Aug. 12, 2025

(54) CONTENT DELIVERY IN REAL-TIME GUIDED NAVIGATION

(71) Applicant: Google LLC, Mountain View, CA (US)

(72) Inventors: Bruce Bahnsen, Boulder, CO (US); Yan Mayster, Aurora, CO (US)

(73) Assignee: Google LLC, Mountain View, CA (US)

( * ) Notice: Subject to any disclaimer, the term of this patent is extended or adjusted under 35 U.S.C. 154(b) by 239 days.

(21) Appl. No.: 17/420,457

(22) PCT Filed: Dec. 29, 2020

(86) PCT No.: PCT/US2020/067284
§ 371 (c)(1),
(2) Date: Jul. 2, 2021

(87) PCT Pub. No.: WO2022/146417
PCT Pub. Date: Jul. 7, 2022

(65) Prior Publication Data
US 2022/0397408 A1 Dec. 15, 2022

(51) Int. Cl.
*G01C 21/34* (2006.01)
*G01C 21/20* (2006.01)

(52) U.S. Cl.
CPC ........ *G01C 21/3476* (2013.01); *G01C 21/20* (2013.01); *G01C 21/3484* (2013.01)

(58) Field of Classification Search
CPC . G01C 21/3476; G01C 21/20; G01C 21/3484
See application file for complete search history.

(56) References Cited

U.S. PATENT DOCUMENTS

| | | |
|---|---|---|
| 7,895,121 B2 | 2/2011 | Lukose et al. |
| 8,621,520 B2 | 12/2013 | Lo et al. |
| 9,164,175 B2 | 10/2015 | Tysowski |
| 2008/0004926 A1* | 1/2008 | Horvitz ............ G06Q 10/06316 705/7.26 |

(Continued)

FOREIGN PATENT DOCUMENTS

| | | |
|---|---|---|
| EP | 1273887 A2 | 1/2003 |
| EP | 2233887 A1 | 9/2010 |

(Continued)

OTHER PUBLICATIONS

Translation of JP2014207526A (Year: 2014).*

(Continued)

*Primary Examiner* — Tamara L Weber
(74) *Attorney, Agent, or Firm* — Lerner David LLP

(57) ABSTRACT

Methods, systems, and apparatuses, including computer storage media, for content delivery in real-time guided navigation. A device can be configured to identify location information for the device and provide navigation instructions to the device based on at least the location information and an identified destination. The device can access scheduling information indicating an availability of a user of the device, and determine based on the scheduling information, whether to provide content related to one or more places of interest. When it is determined to provide the content, the device can determine a timing for output of the content in relation to output of the navigation instructions.

19 Claims, 8 Drawing Sheets

(56) References Cited

U.S. PATENT DOCUMENTS

| | | | |
|---|---|---|---|
| 2009/0216433 A1* | 8/2009 | Griesmer | G01C 21/3691 |
| | | | 701/532 |
| 2011/0071893 A1 | 3/2011 | Malhotra et al. | |
| 2013/0245944 A1* | 9/2013 | Rutten | G08G 1/09685 |
| | | | 701/533 |
| 2015/0006077 A1* | 1/2015 | Baid | G01C 21/3614 |
| | | | 701/538 |
| 2016/0003637 A1* | 1/2016 | Andersen | G01C 21/362 |
| | | | 701/519 |
| 2016/0069689 A1* | 3/2016 | Ikavalko | G01C 21/3484 |
| | | | 701/400 |
| 2017/0108348 A1* | 4/2017 | Hansen | H04W 4/024 |
| 2018/0112995 A1* | 4/2018 | Bortolussi | H04W 4/021 |
| 2018/0283889 A1 | 10/2018 | Koo et al. | |
| 2018/0306597 A1* | 10/2018 | Kosaka | B60K 35/00 |
| 2019/0257667 A1 | 8/2019 | Cummings | |
| 2020/0154245 A1* | 5/2020 | Zhang | H04W 4/029 |
| 2021/0158407 A1* | 5/2021 | Mimassi | G01C 21/3476 |
| 2021/0334326 A1* | 10/2021 | Viswanathan | G06F 16/29 |

FOREIGN PATENT DOCUMENTS

| | | |
|---|---|---|
| JP | 2009092607 A | 4/2009 |
| JP | 2014207526 A * | 10/2014 |
| WO | 2016036622 A1 | 3/2016 |

OTHER PUBLICATIONS

International Search Report and Written Opinion for International Application No. PCT/US2020/067284 dated Nov. 25, 2021. 20 pages.

Invitation to Pay Additional Fees for International Application No. PCT/US2020/067284 dated Oct. 4, 2021. 12 pages.

International Preliminary Report on Patentability for International Application No. PCT/US2020/067284 dated Jul. 13, 2023. 12 pages.

* cited by examiner

CONTENT DELIVERY IN REAL-TIME GUIDED NAVIGATION

CROSS-REFERENCE TO RELATED APPLICATION

This application is a national phase entry under 35 U.S.C. § 371 of International Application No.: PCT/US2020/067284, filed on Dec. 29, 2020, the entire disclosure of which is incorporated herein by reference.

BACKGROUND

Guided navigation systems provide visual and/or audio output for guiding a user of the system from one location to another. The guided navigation systems provide navigation instructions for reaching a destination, and the user can perform actions corresponding to the instructions, such as operating a vehicle to reach the destination. The navigation instructions are typically presented visibly on a display, or spoken audibly by appropriately configured software of the guided navigation system.

BRIEF SUMMARY

Aspects of this disclosure provide for a guided navigation system configured to adjust a route between an origin and destination in a context-based content-driven manner. The guided navigation system can identify content, such as a recommendation to visit a place of interest (POI), to provide to the user as the user navigates a route to a destination. The recommendation by the guided navigation system can be made in the context of the availability of the user. For example, the system can determine whether the user has time to visit the POI without being late to their final destination, before sending the recommendation.

The system can receive a plurality of signals provided by the user that characterizes, for example, their interests and location. The system can receive scheduling information provided by the user indicating a scheduled time a user has to reach the destination. The system can determine whether to provide the identified content to the user based at least on the scheduling information and the user signals. In this way, the system determines content for presentation that is not only user-relevant, but also plans for a possible deviation by the user to the POI related to the content, and while providing guided navigation for arriving at the destination safely within the scheduled time. The disclosed method is therefore able to readily identify whether travel to a particular POI is possible within a given timeframe, based on a knowledge of where the user has to be at a future time.

One aspect of the disclosure provides for a method, including identifying, by one or more processors, location information for a computing device, providing navigation instructions to the computing device based on at least the location information and an identified destination, identifying, by the one or more processors, one or more places of interest (POIs) within a predetermined range of the location of the computing device, accessing, by the one or more processors, scheduling information indicating an availability of a user of the computing device, and determining, based on at least the scheduling information, whether to provide content to the computing device, the content related to a selected one of the identified one or more POIs. The method may further include determining a timing for output of the content in relation to output of the navigation instructions when it is determined to provide the content.

According to some examples, determining whether to provide the content to the computing device further includes calculating a total detour time for visiting the selected POI related to the content, calculating, from the total detour time and a current estimated time of arrival to the destination, an updated estimated time of arrival, and determining, based on the updated estimated time of arrival and the scheduling information, whether the user has availability to visit the selected POI. Calculating the total detour time may include estimating an amount of time required to travel to the identified POI and return to an original route, receiving information corresponding to an average length of visit to the identified POI, and adding the estimated amount of time with the average length of visit to the identified POI. Receiving information corresponding to the average length of visit to the selected POI may be based on historical data from a plurality of mobile devices that have visited the selected POI. The selected POI may be one of a plurality of POIs of a particular category of POIs, and the method may further include receiving one or more user signals characterizing length of visits by the user to one or more of the plurality of POIs of the particular category, and updating the average length of visit to the identified POI based on at least the one or more user signals.

According to some examples, the method may further include determining that the computing device is currently located at the selected POI, and sending data to the computing device suggesting time remaining for the length of visit based on the scheduling information.

In response to determining the timing for the output, the method may further include providing the content to the computing device during the timing. The selected POI may be, for example, a restaurant, store, or service location.

Another aspect of the disclosure provides a computing device including one or more processors, wherein the one or more processors are configured to identify location information for the computing device, receive navigation instructions based on at least the location information and an identified destination, identify one or more places of interest (POIs) within a predetermined range of the location of the computing device, access scheduling information indicating an availability of a user of the device, and determine, based on at least the scheduling information, whether to provide content to the device, the content related to a selected POI of the identified one or more POIs.

The one or more processors may be further configured to determine a timing for output of the content in relation to output of the navigation instructions when it is determined to provide the content.

The one or more processors may be further configured to calculate a total detour time for visiting the identified POI related to the content, calculate, from the total detour time and a current estimated time of arrival to the destination, an updated estimated time of arrival, and determine, based on the updated estimated time of arrival and the scheduling information, whether the user has availability to visit the identified POI. In some examples, the one or more processors may be further configured to estimate an amount of time required to travel to the identified POI and return to an original route, receive information corresponding to an average length of visit to the selected POI, and add the estimated amount of time with the average length of visit to the selected POI. The one or more processors may be further configured to receive an average length of visit to the selected POI based on historical data from a plurality of mobile devices that have visited the selected POI.

The selected POI may be one of a plurality of POIs of a particular category of POIs, and the one or more processors may be further configured to receive one or more user signals characterizing length of visits by the user to one or more of the plurality of POIs of the particular category, and update the average length of visit to the selected POI based on at least the one or more user signals.

According to some examples, the one or more processors may be further configured to determine that the computing device is currently located at the selected POI, and send data to the computing device suggesting time remaining for the length of visit based on the scheduling information. The one or more processors may be further configured to, in response to determining the timing for the output, provide the content during the timing. According to some examples, the selected POI may be a restaurant, store, or service location.

Yet another aspect of the disclosure provides a non-transitory computer readable medium storing instructions executable by one or more processors for performing a method, including identifying location information for the computing device, receiving navigation instructions based on at least the location information and an identified destination, identifying one or more places of interest (POIs) within a predetermined range of the location of the computing device, accessing scheduling information indicating an availability of a user of the device, and determining, based on at least the scheduling information, whether to provide content to the device, the content related to a selected POI of the identified one or more POIs. The non-transitory computer-readable medium may further include instructions to determine a timing for output of the content in relation to output of the navigation instructions when it is determined to provide the content.

Other implementations of the foregoing aspect can include a computer-implemented method, an apparatus, and computer programs recorded on one or more computer-readable storage media.

DETAILED DESCRIPTION

Overview

Aspects of this disclosure relate to providing navigation instructions, including selecting and audibly delivering time- and context-based content, and receive real-time feedback. The real-time feedback may be used to determine an effectiveness of the content. By way of example, navigation instructions may be supplied to a user device. During times when the navigation instructions are delivered with decreased frequency, content of particular interest to the user may be audibly delivered. The content may be, for example, an advertisement for a particular POI. The POI may be selected based on a first set of factors related to the POI and a second set of factors related to the user. For example, the first set of factors related to the POI may include its type, location, level of busyness, and/or an amount of time people typically spend at the POI. The second set of factors related to the user may include, for example, the user's interests and an amount of time available in the user's schedule.

Figure 1:
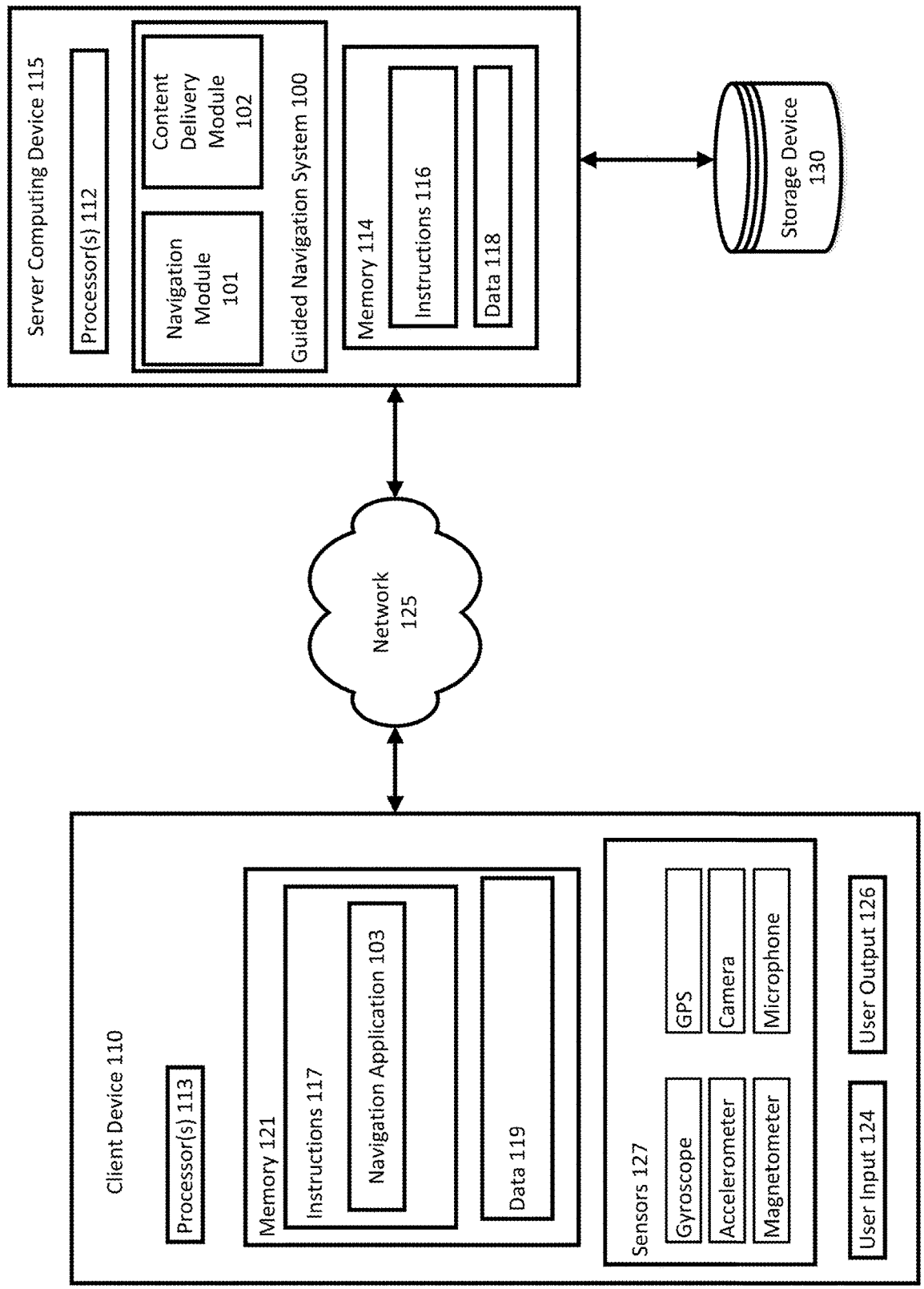
FIG. 1 is a block diagram of a user computing device implementing a guided navigation system and in communication with a server computing device according to aspects of the disclosure.

A guided navigation system can be implemented on a client computing device, on one or more server computing devices in communication with the client computing device, or on a combination of the client computing device and the one or more server computing devices. For example, as shown in FIG. 1, a client computing device 110 can implement a navigation application 103 in communication with the guided navigation system 100. The navigation application 103 may be a software application configured to send and receive data to and from a server computing device 115 implementing the guided navigation system 100.

The guided navigation system may be configured to receive an input origin and destination, and to generate a route including navigation instructions for guiding a user of the client device. The guided navigation system 100 can include a navigation module 101 configured for generating navigation instructions for output on the client computing device 110. The guided navigation system 100 can also include a content delivery module 102 configured to deliver content predicted to be relevant to a user of the client computing device 110, and further configured to deliver relevant content for a selected POI. The selected POI may be selected based on the user's interests, its location relevant to a navigation route, a schedule of the user, and an amount of time typically spent at the selected POI.

The client computing device can be any of a variety of different devices, such as a smartphone, a tablet, a laptop, a dedicated guided navigation device, or a dedicated component of a vehicle. The client computing device can also be a device configured for providing an augmented reality (AR) and/or virtual reality (VR) experience to a user of the device. The client computing device can display instructions visually, such as through a touchscreen of the device or as part of a visual overlay presented in the user's field of view when the user operates the device.

The guided navigation system may be configured to determine content for output by the client computing device, as the guided navigation system guides the user and device also provides navigation instructions along the route to the destination. Content can refer to audio content that can be output by the client computing device as speech or other forms of sound. For example, the content may include advertisements, such as information regarding a particular point of interest or an invitation to alter the route to visit the particular point of interest. Indeed, any other type of content may be provided. The context for providing the content may include a user's interests and preferences, characteristics of the POI related to the content to be presented, and current traffic and/or street conditions on-route to the user's final destination.

As described herein, audio content is output through the client computing device in a manner that is considered unlikely to distract the user. The user may be performing one of a variety of tasks while operating the user computing device and receiving navigation instructions from the guided navigation system. For example, the user may be operating a car or some other vehicle, relying on the guided navigation system and its generated navigation instructions to arrive at the intended destination. In other examples, the user may be walking, jogging, or riding a bicycle, skateboard, or other means of transportation. Regardless of the mode of transportation, the guided navigation system can provide navigation instructions and additional audio content to the user in a manner that is not likely to distract the user from safely navigating through vehicle/pedestrian traffic, traffic signs/lights, or other obstructions. By taking various factors relating to the specific circumstances into account, the system is able to provide navigation instructions at a time determined to be safe for the user to receive the instructions.

In addition to audio content, content as described herein can also refer to textual or visual content, for example displayed on the display of a user computing device. Similar to how audio content is handled, the guided navigation system as described herein is configured to present visual/textual content through the user computing device under circumstances that are unlikely to distract the user as they travel to their destination.

Example Systems

FIG. 1 is a block diagram of a client computing device 110 in communication with a server computing device 115. The client computing device 110 can be configured to communicate with the server computing device 115 over a network 125.

The client computing device 110 can be any of a variety of different types of devices capable of processing instructions and transmitting data to and from humans and other computers, such as a laptop, a mobile device like a phone or a tablet, a video game console, or a device intended to be worn, such as a watch, earbuds, headset, helmet, or glasses. The user computing device can also be a device configured for providing an augmented reality (AR) and/or virtual reality (VR) experience to a user of the device. The client computing device can be a wearable device, such as glasses, contact lenses, a watch or bracelet, or a headset or helmet configured for AR/VR.

The server computing device 115 can be a single device, or can be part of a datacenter, which itself may be part of a cloud computing platform. The cloud computing platform can include a plurality of datacenters including multiple server computing devices, such as the server computing device 115.

The devices 110, 115 can be capable of direct and indirect communication over the network 125. For example, using an Internet socket, the user computing device 110 can connect to a service operating on the server computing device 115 through an Internet protocol. The server computing device 115 can set up listening sockets that may accept an initiating connection for sending and receiving information. The network 125 itself can include various configurations and protocols including the Internet, World Wide Web, intranets, virtual private networks, wide area networks, local networks, and private networks using communication protocols proprietary to one or more companies. The network 125 can support short- and long-range connections along a variety of different bandwidths, such as 2.402 GHz to 2.480 GHz, commonly associated with the Bluetooth® standard, 2.4 GHz and 5 GHz, commonly associated with the Wi-Fi® communication protocol, or with a variety of communication standards, such as the LTE® standard for wireless broadband communication. The network 125, in addition or alternatively, can also support wired connections between the devices 110, 115, including various types of Ethernet connection.

The server computing device 115 can be coupled to one or more storage devices 130. The storage device(s) 130 can be a combination of volatile and non-volatile memory, and can be at the same or different physical locations relative to the server computing device 115. For example, the storage device(s) 130 can include any type of non-transitory computer readable medium capable of storing information, such as a hard-drive, solid state drive, tape drive, optical storage, memory card, ROM, RAM, DVD, SD card, write-capable, and read-only memories. The storage device(s) 130 may store, for example, data files, documents, code, schemas, applications, or any of a variety of other information or tools typically stored in databases.

The server computing device 115 can include one or more processors 112 and memory 114. The memory 114 can store information accessible by the processor(s) 112, including instructions 116 that can be executed by the processor(s) 112. The memory 114 can also include data 118 that can be retrieved, manipulated or stored by the processor(s) 112. The memory 114 can be a type of non-transitory computer readable medium capable of storing information accessible by the processors 112, such as volatile and non-volatile memory. The processor(s) 112 can include one or more central processing units (CPUs), graphic processing units (GPUs), field-programmable gate arrays (FPGAs), and application-specific integrated circuits (ASICs), such as tensor processing units (TPUs).

The instructions 116 can be one or more instructions that when executed by the processor(s) 112, causes the processor(s) 112 to perform actions defined by the instructions. The instructions 116 can be stored in object code format for direct processing by the processors 112, or other in other formats including interpretable scripts or collections of independent source code modules that are interpreted on demand or compiled in advance. In this regard, the terms "instructions," "steps" and "programs" can be used interchangeably herein.

The data 118 can be retrieved, stored, or modified by the processors 112 in accordance with the instructions 116. The data 118 can be stored in computer registers, in a relational or non-relational database as a table having a plurality of different fields and records, or as JSON, YAML, proto, or XML documents. The data 118 can also be formatted in a computer-readable format such as, but not limited to, binary values, ASCII or Unicode. Moreover, the data 118 can include information sufficient to identify relevant information, such as numbers, descriptive text, proprietary codes, pointers, references to data stored in other memories, including other network locations, or information that is used by a function to calculate relevant data.

The client computing device 110 may be any of a variable of types of mobile or portable devices, such as an in-vehicle dashboard computer, smartphone, smartwatch, head-mounted display, gaming console, or the like. While only one client computing device 110 is shown in FIG. 1, it should be understood that numerous client computing devices may communicate with the servicer computing device 115 over the network 125 at any given time.

The client computing device 110 can be configured similarly to the server computing device 115, with one or more processors 113, memory 121, instructions 117, and data 119. The instructions 117 can include one or more instructions, which when executed by the one or more processors 113, causes the processor(s) 113 to perform operations for executing the guided navigation system 100.

The client computing device 110 can also include a user input 124, and a user output 126. The user input 124 can include any appropriate mechanism or technique for receiving input from a user, such as keyboard, mouse, mechanical actuators, soft actuators, touchscreens, microphones, and sensors.

The client computing device 110 may have all of the components normally used in connection with a mobile computing device such as a processor, memory (e.g., RAM and internal hard drives) storing data and instructions, a user output device 126 such as display or speakers, and user input device 124 (e.g., input buttons, touch-screen, microphone, etc.). The client computing device may also include one or more sensors 127 for detecting conditions surrounding the device. For example, the sensors 127 may include an image capture device, such as a camera for recording video streams and/or capturing images, speakers, a network interface device, and all of the components used for connecting these elements to one another. The sensors 127 may also include a location determination system, such as a GPS. Other examples of location determination systems may determine location based on wireless access signal strength, images of geographic objects such as landmarks, semantic indicators such as light or noise level, etc.

As will be described in further detail below, the client computing device 110 may provide information used to determine relevant content to the server 115 and/or the storage system 130. For example, such information may include scheduling information such as calendared appointments, browsing or search history, or other information indicating the user's interests or preferences. The client computing devices 110 each have a privacy setting, which must be set to authorize supplying such information. For example, a user of the client computing device 110 has an option to turn such features on or off, and may have an option to select which types of information are supplied and which types are not. By way of example only, the user may allow for supplying scheduling information, but not content viewing history. Further, the user can define particular times when supplying information is allowed, such as only when the navigation application 103 is in use.

Moreover, privacy protections are provided for any data transmitted by the mobile device, including, for example, anonymization of personally identifiable information, aggregation of data, filtering of sensitive information, encryption, hashing or filtering of sensitive information to remove personal attributes, time limitations on storage of information, or limitations on data use or sharing. For example, detailed location information may only be stored for a relatively short-lived period of time in the storage system 130. Moreover, data may be anonymized and aggregated such that individual user data is not revealed. Rather than using any personal information to uniquely identify a mobile device, a hash of a unique identifier may be used. For example, the hash may be a cryptographic hash. The hash may have a high collision rate. The hash may be applied to a unique number or text string associated with a mobile device. In this regard, no personal information is stored.

The server computing device 115 can be configured to transmit data to the user computing device 110, and the user computing device 110 can be configured to output data through a user output 126. For example, the user output 126 can be a display used for displaying a user interface on the user computing device 110. The user output 126 can alternatively or additionally include one or more speakers, transducers or other audio outputs, a haptic interface or other tactile feedback that provides non-visual and non-audible information to the platform user of the user computing device 110.

The client computing device 110 can be configured for communicating with the server computing device 115 implementing the guided navigation system 100 through a navigation application 103. The navigation application 103 can be installed on the client computing device 110 and configured for receiving input and sending input to the guided navigation system 100. The navigation application can also be configured to receive data from the guided navigation system, such as navigation instructions or curated content, as described herein.

The navigation application 103 can include a user interface, for example configured to show a map and assorted interactive menus displayed on a touch screen of the client computing device. As another example, the navigation application 103 can include an augmented or virtual reality interface, such as a visual overlay displayed on a lens and appearing in the user's field-of-view when the client computing device 110 is operated.

The navigation module 101 can be configured to generate navigation instructions defining a route between an origin and a destination. The navigation module 101 can receive input specifying an origin, for example through a corresponding input field on a user interface displayed or presented on the user computing device 110. The navigation module 101 can also receive input in other ways, such as from a voice command or as data transmitted from one device to the server computing device 115, for example from a smartphone.

The navigation module 101 can receive data specifying an origin and/or the current location from sensor data collected from one or more sensors 127. As part of collecting the sensor data, the software application 103 can generate a prompt to confirm by the user of the user computing device 110 their permission to access and use the sensor data. The sensor data collected can include location data representing the current location of the user computing device 110. The origin for a new route can be the current location as indicated by the location data received by the navigation module 101.

The client computing device 110 can use any of a variety of local or satellite navigation systems for determining its current location. Examples include the GPS navigation satellite system, the BeiDou navigation satellite system, and GLONASS, among others. The location data can be represented in a variety of different formats, including coordinates representing the position in longitude and latitude coordinates, as well as additional information characterizing the velocity of the user computing device 110 at different times.

However the navigation module 101 receives location data, the navigation module 101 is configured to generate navigation instructions specifying a route between the origin and the destination location. As part of generating the navigation instructions, the navigation module 101 can adjust the route according to different factors, such as a means of transportation, for example by walking, bicycle, public transportation, or operating a car or some other vehicle. The navigation module 101 can also be configured to receive traffic and street data corresponding to current traffic conditions and publicly available walkways, roads, or paths. Once travel commences, the navigation module 101 can update navigation instructions in real-time to specify a modified or new route to reaching the destination. The navigation module 101 can do this automatically in response to updated received information about traffic and street data, or can update navigation instructions in response to user input.

In some implementations, the navigation module 101 is implemented on the client computing device 110. In those implementations, the client computing device 110 can be configured to receive traffic and street data, and generate navigation instructions from an origin to a destination.

Content delivery module 102 is configured to identify content, and determine whether and/or when to cause the client computing device 110 to output the identified content during travel to a destination guided by the navigation module 101.

Content delivery module 102 can obtain location information characterizing the current location of the client computing device 110, and identify POIs within a predetermined range of the client computing device 110.

The server computing device 115 can receive content related to a particular POI by an entity associated with or responsible for the POI. An entity can be, for example, an individual, an organization of multiple individuals, a legal or business entity, or automated software configured to provide content related to a POI to the server computing device 115. As an example, a restaurant owner may provide content by way of an audio advertisement about their restaurant to the server computing device 115. The server computing device 115 can register the restaurant as a POI, and store the advertisement as content related to the restaurant.

The relationship between the entity associated with the POI and the server computing device 115 can be characterized in a variety of different ways. For example, the server computing device 115 can be configured to provide a service at-cost for sending content related to a POI to user computing devices, according to techniques described herein. As an example and as described in more detail herein, the server computing device 115 can charge the entity based on conversion data representing action taken by a user in response to receiving content related to the POI.

The content delivery module 102 is configured to receive data corresponding to POIs located along or near the route planned by the navigation module 101 for reaching a destination. For example, the content delivery module 102 can receive a list of POIs within the predetermined range 225. The predetermined range can be defined in a variety of ways. For example, the range can be a distance measured from the user computing device, such as a predetermined radius defining the range as a circle. As another example, the range can be defined as a function of time or distance from the current location of the user computing device 110, measured along roads or paths. For instance, the predetermined range can be defined as the region within ten minutes of travel time, given current traffic and street conditions. In some implementations the predetermined range can be set so as to not include POIs that require backtracking relative to the final destination to reach.

As an example, the user computing device 110 can provide the current location information to the navigation module 101, and in response the navigation module 101 can provide data corresponding to different POIs, including their locations and a description of goods or services provided at each POI. In some examples, the user computing device 110 can cache a map and information related to different POIs, and access the map and information and output data corresponding to the POIs 210-220 within range of the user computing device 110.

The content delivery module 102 may process information related to candidate POIs to determine whether to output content to the user, and if so, a proper and safe timing for doing so. Determining whether to output content related to the candidate POIs can include determining whether content related to a POI is likely to be relevant to the user. The content delivery module 102 in general can leverage a variety of signals for determining relevance.

Figure 2:
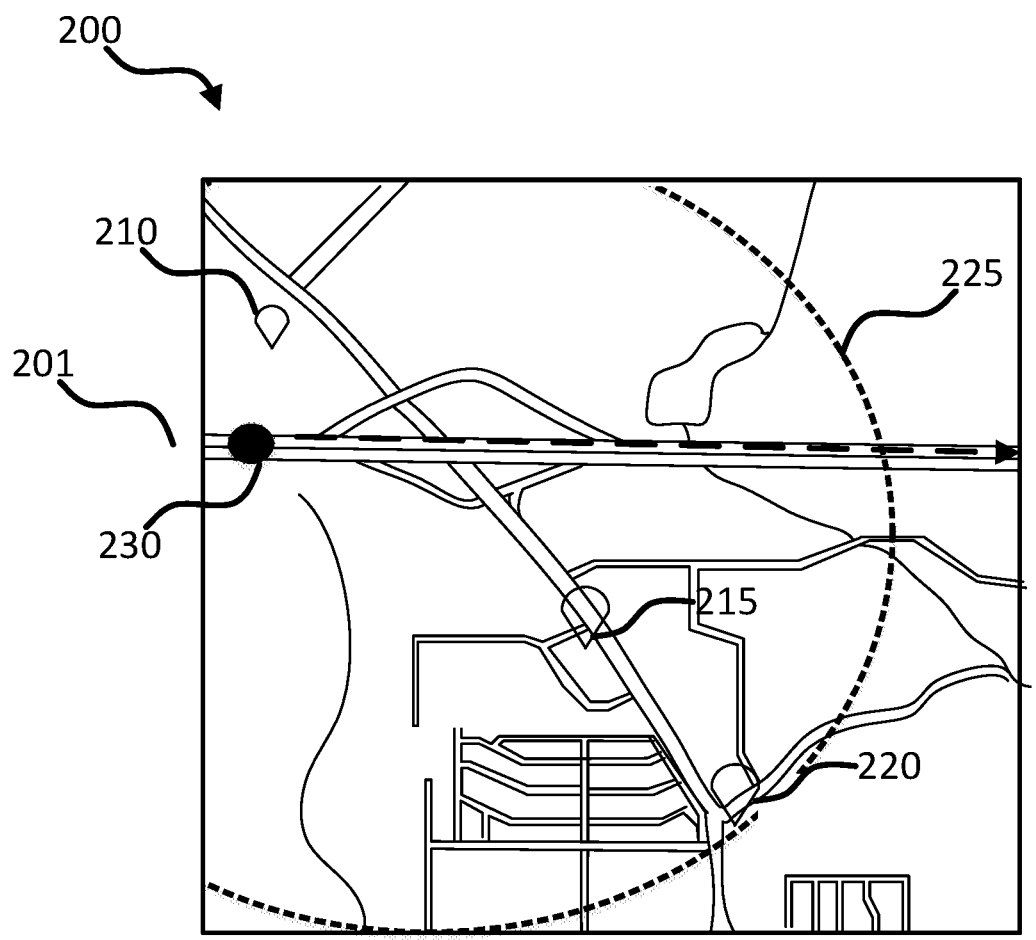
FIG. 2 shows a map with a route planned by a guided navigation system with multiple candidate POIs within a predetermined range of the route according to aspects of the disclosure.

FIG. 2 shows a map 200 with a route 201 planned by a guided navigation system and showing multiple POIs 210-220. The map 200 can be shown as part of an interface displayed on a user computing device in communication with the guided navigation system. While the user computing device is on-route to a destination, for example in a vehicle 230, the map 200 can display the current route 201 taken.

In this example, a displayed portion of route 201 corresponds to navigation instructions generated by the guided navigation system to travel along a highway. The guided navigation system can identify the current location of the user computing device along the route. The guided navigation system can identify POIs 210-220 within a predetermined range 225 of the user computing device.

The subject of content that can be provided to the user through the user computing device can take on a variety of forms, and can be related to a POI. A POI can be any location that is publicly accessible, and which may provide some source of attraction, diversion, product, or service to the user. Examples of a POI include businesses, such as restaurants, shops, or service providers such as mechanic auto shops, hotels, gas stations, and electric vehicle charging stations. The nature of the POI can be for-profit or not-for-profit, educational, commercial, or be at least part of a location or facility publicly available. Additional examples include natural landmarks, parks, public service providers such as police stations or post offices, and civil service locations, such as a municipal building.

Some POIs can be relevant to users of the guided navigation system in general, while some locations may only be relevant to subsets of the user base for the system. How a location is considered to be "relevant" to a particular user can be based on user-provided signals and other data, described herein. For example, a stamp store selling stamps may only be considered relevant to certain users that the system predicts are interested in stamps.

The content associated with a POI can include some information related to the POI. The guided navigation system is configured to audibly present content related to a POI as a recommendation, invitation, or advertisement to go visit the POI. The content associated with the POI can be provided to one or more server computing devices coupled to the user computing device, and configured to store content from which the guided navigation system can obtain and present to the user through speakers or another source of audio output of the user computing device.

As one example, the POI 215 can be an American-style restaurant, and the subject of the content can be a recommendation to come dine at the restaurant. The recommendation can be output through the user computing device as speech, for example as the phrase: "Come join us at 'OLD FASHIONED AMERICAN' for American-style dining!" In general, the content can be presented as a natural expression in speech, for example as part of a conversation between the user and the guided navigation system. The guided navigation system can implement any of a variety of different speech recognition and synthesizing techniques for interpreted speech input and providing speech output, respectively.

As described in more detail herein, the guided navigation system is configured to identify content relevant to the user, and output the content according to a determined timing so as to not distract the user from navigating to their destination. As part of determining the relevancy of content related to different POIs near the current location of the user computing device, the guided navigation system can determine the total detour time needed for the user to visit the POI if desired. This calculation can be performed before determining whether to present the content to the user, at least because content is not likely to be as relevant to a user if the user would not be able to make time to visit the POI.

To determine relevance to the user for a particular POI, as well as availability of the user to visit the POI if desired, the guided navigation system is configured to use a plurality of signals relating to characteristics of the user, the POI, and traffic and/or street conditions. Before data related to the user is used, the guided navigation system can prompt the user for permission to use various types of information, such as location data, the calendar or scheduling data, and data related to historical preferences the user may have towards other POIs. The scheduling data can include, for example, calendar entries or other sources of information indicating appointments and deadlines at or near a destination entered into the navigation system. The guided navigation system can provide options to the user to prevent supplying data, and/or to rescind permission for the use of data as described herein for any reason, and at any time.

With authorized use of supplied data, the guided navigation system can generate different weights for different POIs within the predetermined range of the user computing device. As described in more detail herein, the guided navigation system can predict the relevancy of different POIs in comparison to one another, using a variety of signals that can provide different indicators of a user's interest for different POIs, for example based on actions recorded as conversion data and fed back to the guided navigation system for further analysis and processing.

Figure 3:
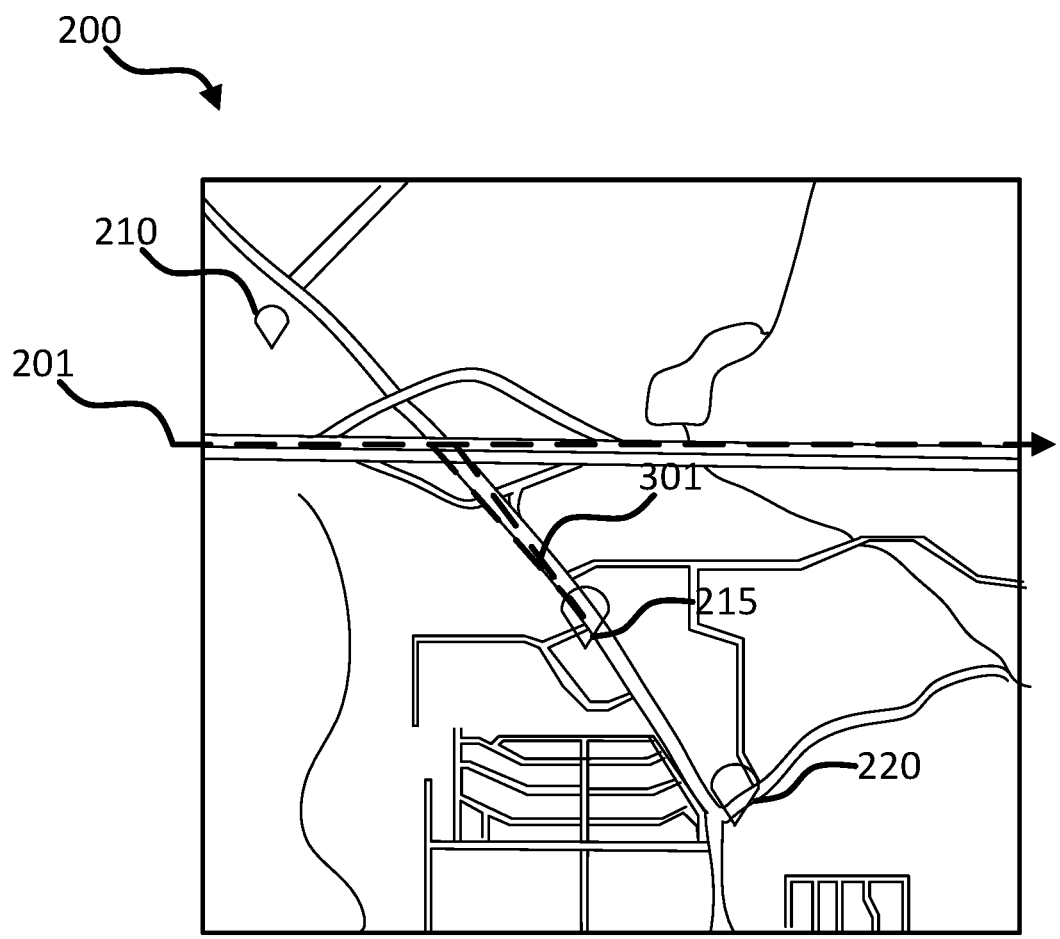
FIG. 3 shows a map with a detour to a selected POI according to aspects of the disclosure.

FIG. 3 shows the map 200 with a detour 301 to the POI 215. The global navigation system is configured to generate a modified route, in response to the user computing device receiving input to add the POI 215 as an intermediate destination. The guided navigation system can determine a total detour time representing the total time predicted for arriving at the POI, leaving the POI, and the predicted length of visit for the user at the POI. As described in more detail herein, the predicted length of the visit for the user can be based on a combination of crowd-sourced historical data, as well as historical data particular to the user for past visits to the same or similar POIs.

In addition to calculating the total detour time, the guided navigation system can determine whether the detour to the POI, if accepted by the user, would fit within the user's schedule. For example, it may determine whether acceptance of the detour would cause the user to be late to a time-sensitive deadline or appointment. For example, the total detour time to the POI 215 may be 45 minutes, including 15 additional minutes of travel time and 30 minutes spent on average by people at the POI 215. However, the estimated time of arrival at the destination entered into the navigation system may be only 10 minutes before an appointment scheduled in the user's calendar at a location near the destination. Accordingly, it may be determined that the user does not have enough time to visit the POI 215, and the guided navigation system 215 may determine to not present content related to the POI 215, even if the POI 215 is otherwise predicted to be highly relevant to the user.

The average time spent at the POI can be divided by time-of-day or in other temporal contexts. For example, the system can calculate the average length-of-visit for each day of the week, certain times of day, or around certain seasons or holidays/events.

According to some examples, the system can be configured to adjust a predicted length of visit by data specific to the user. As a result, in some cases the length-of-stay associated with a POI may be shorter or longer when user habits are factored. As an example, if the user historically spends one hour or more at a stamp shop, but the average length-of-stay at a particular stamp shop is thirty minutes, then the actual length-of-stay for the user can be some time greater than thirty minutes to reflect known user behavior.

The length-of-stay information for a given POI can be added to a predicted travel time to reach the POI as an intermediate destination and return to the original route. For example, the time spent to arrive at the POI and travel back from the POI to the route for the final destination may be predicted to take ten minutes total. Therefore, as part of determining whether the user has availability to go to the POI as an intermediate destination, the predicted time spent at the POI is added to the travel time to and from the POI. The system may also factor in traffic and street data as described elsewhere for generating the route to the destination.

According to some examples, the guided navigation system can consider the added detour time as a factor in determining which content, such as which POI to advertise, to present to the user. Other factors may include, for example, user interest, current occupancy at the POI, or any of a variety of other factors.

The guided navigation system can output the content between navigation instructions to the destination audibly and/or visually output through the user computing device. After the content is output, the guided navigation system can follow with a prompt through the user computing device to add the POI associated with the output content as an intermediate destination. An intermediate destination is a destination added before the final destination along a route generated by the guided navigation system, such as the POI 215 as shown in FIG. 3. The user computing device can receive a response to the prompt, for example as an audible affirmation or rejection by a user and recorded through a microphones or other recording device coupled to the user computing device. The user computing device can send the response affirmation or rejection to the guided navigation system, and in turn receive instructions for reaching the intermediate destination, as appropriate.

Different actions taken by the user following receipt of content can be used as feedback to more accurately predict future POIs that the user may consider relevant. In addition, conversion data can be recorded and directly attributed to content related to a POI. For example, if the user computing device is recorded as being at a particular POI after content related to the POI was presented through the user computing device, then the subsequent visit to the POI can be attributed to the presentation of the content.

Because the attribution is direct and easily discernible, precise conversion data can be used as described herein for monetization arrangements between an entity associated with a POI and a service for registering, receiving, and later providing content related to the POI. Such arrangements can allow for compensation by the POI that accurately reflects value added to the POI from the content curated and presented by the guided navigation system.

Figure 4:
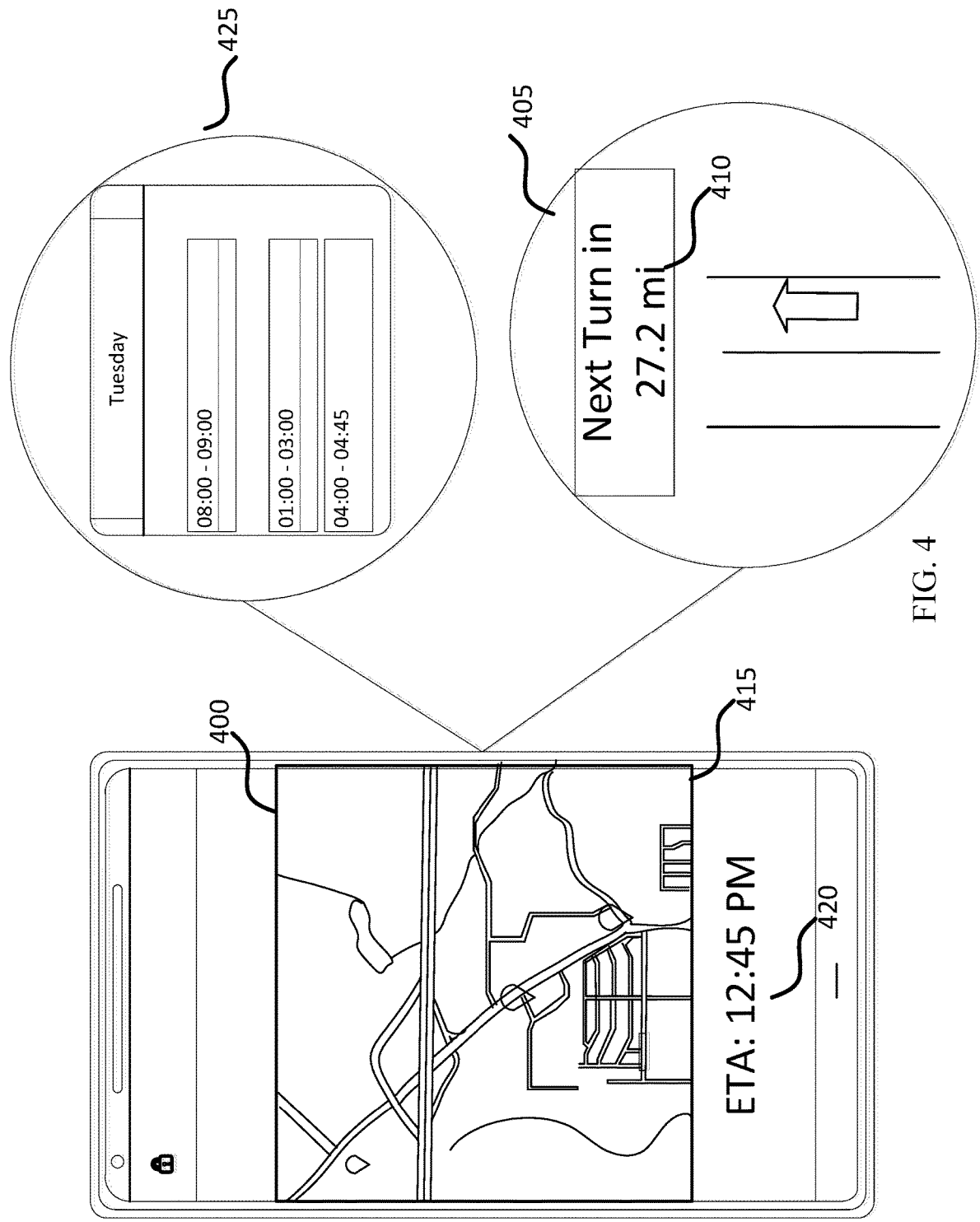
FIG. 4 illustrates an example of timing information used to determine delivery of content according to aspects of the disclosure.

FIG. 4 illustrates an example of timing information used to determine delivery of content. A mobile device used for navigation may include a user interface 400 that displays turn-by-turn directions or other navigation information. Delivery of content related to a POI may depend on the navigation information. For example, as shown, an upcoming navigation instruction 405, including a distance 410 and/or time to the location in which the navigation instruction is to be performed, indicates that there is a long stretch before the next turn operation. During this time, a driver or operator is less likely to be distracted by content delivery, as there is less need to focus on other operations. Accordingly, it may be determined that the long stretch is a good opportunity for delivering content safely. The navigation system may consider which POIs are within a current range or will come within range during the long stretch.

In considering whether and when to deliver content, the system may further consider scheduling information for the operator, such as a calendar 425. According to some examples, the system may additionally or alternatively consider scheduling information for other passengers in the vehicle, provided that such passengers authorize supplying the information. The calendar 425 can include scheduling information indicating different appointments. For example, the scheduling information can include a calendar entry for an appointment at 1:00 PM at the destination. The guided navigation system 100 can predict the estimated time of arrival at the destination, for example, based on current location, distance to the destination, traffic, and other variables. In some examples, the user interface 400 can show a map 415 showing the current location of the user computing device 110 as well as an estimated time of arrival (ETA) 415 at the destination. The system may determine, based on the scheduling information 425 and the ETA 420, whether the user will have enough time to visit one or more POIs. This determination may be used to select content for delivery to the user during the long stretch. For examples, content may be selected for a particular POI that the user has time to visit, such as based on the additional travel time and time spent at the POI, as discussed above. Indeed, the system may only provide content for those POIs that the user is able to visit while still reaching the destination on time. In this manner, the amount of information provided is reduced as only the information relating to reachable POIs is provided. This improves the safety of the system as the amount of distractions presented to the user during navigation are minimized. Additionally, in some examples the POIs that are not reachable within the user's available time can be omitted from display on the map, thereby reducing clutter on the displayed map.

Another factor for selecting content for delivery through the mobile device during navigation may be relevance of the content to the user. Relevance can be determined through a variety of different signals. Signals can include data characterizing different aspects of user preferences or predicted interests, such as places visited, services and/or goods purchased or browsed, etc. For example, one signal that can indicate a high relevance is past visits by the user to similar POIs. A user who frequents stamp stores, for example, is generally more likely to want to visit a stamp store on-route to their destination, which can be an indicator of high relevance for the user.

Relevance can also be determined through actions taken by the user in response to receiving content related to a POI. These actions can be recorded as a number of different conversion metrics. For example, one such action can be whether the user computing device, after outputting the content, receives a command from the user for more information about the POI. Another action can be if the user instructs the guided navigation system 100 to add the POI related to the content outputted as an intermediate destination. These and other actions can be recorded and attributed to the relevance of the POI, and other related POIs, and can be used to train the guided navigation system 100 to predict future relevant POIs.

As mentioned above, the signals used to determine relevance can include POIs that the user has visited in the past. For example, where supply of such information is authorized by the user, such POIs can be determined from location data coinciding with the location of visited POIs, and/or by financial transactions recorded between an entity associated with the POI and the user. The signals can also indicate the duration of time spent at the POI, or patterns of the visits, for example every day, every week, or every other week at a particular time.

The signals can also characterize online activity, such as browsing history and/or patterns, contents of a shopping cart maintained by various web pages, or resources accessed.

Figure 5:
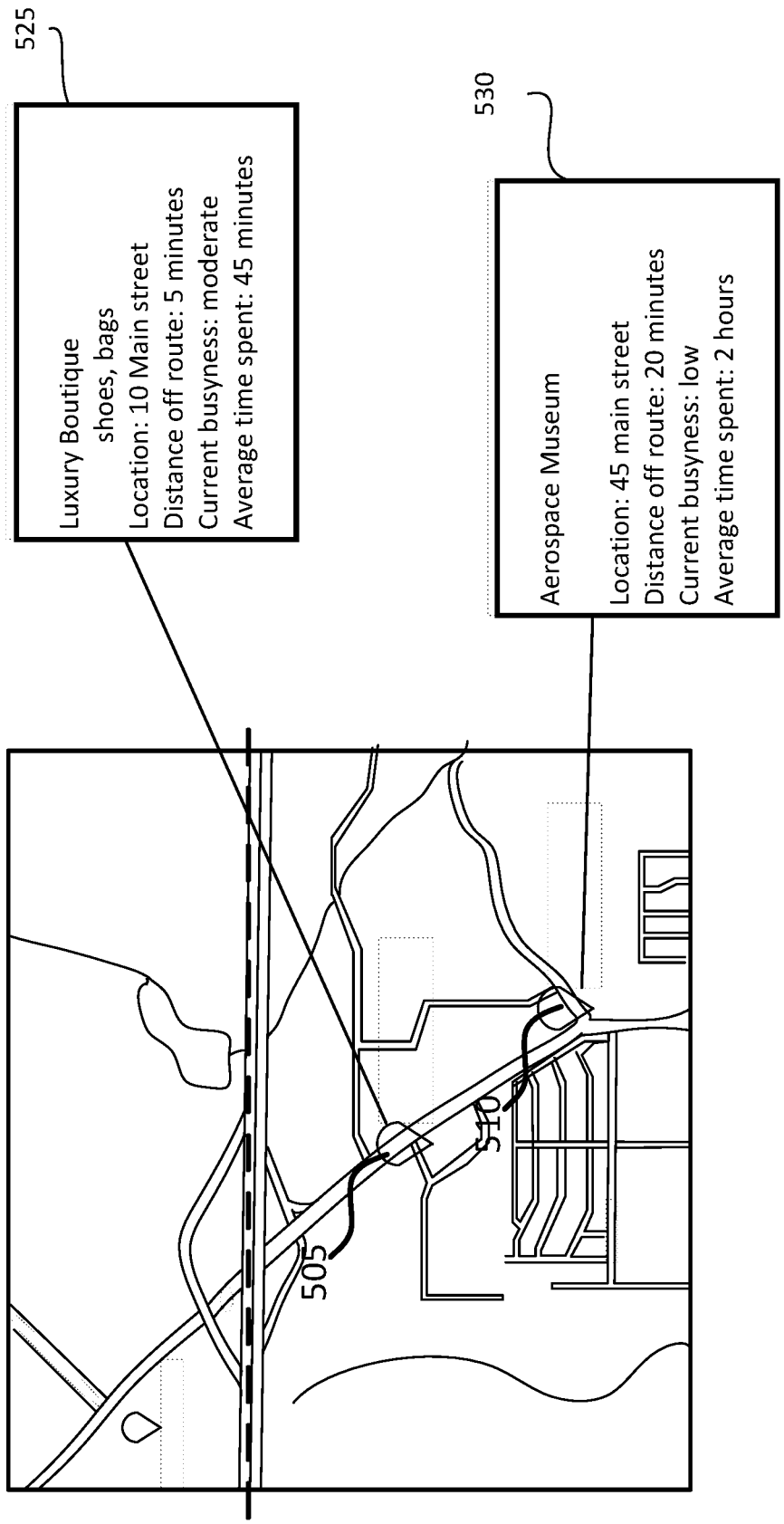
FIG. 5 illustrates information associated with various candidate POIs according to aspects of the disclosure.

As shown in FIG. 5, the system may also consider information related to various candidate POIs when determining which content to deliver. For example, the system may access POI information 525, 530 representing characteristics of candidate POIs 505, 510. The POI information 525, 530 can relate to general and contextual characteristics of the POI. General characteristics include the type of POI, such as a restaurant, shop, or service center, location, types of items or services, an average amount of time spent by people at the POI, etc. Contextual characteristics of the POI can include characteristics for the POI at a particular time, either actual or predicted, such as busyness of the POI at different points in a day or different days in a week. Contextual characteristics may also include characteristics relative to a particular user or client computing device, such as relative location, distance off route, detour time, etc. While FIG. 5 illustrates some examples of the types of candidate POI information that may be considered when determining which content to provide, it should be understood that various other types of information may additionally or alternatively be considered. For example, other types of candidate POI information may include an amount of content of a given POI that has already been delivered, such as a number of ads, an amount of conversions for the given POI, a current occupancy of the given POI, a capacity of the POI, etc. Moreover, while only two candidate POIs are shown, it should be understood that POI information for numerous candidate POIs may be considered at any given time.

Figure 6:
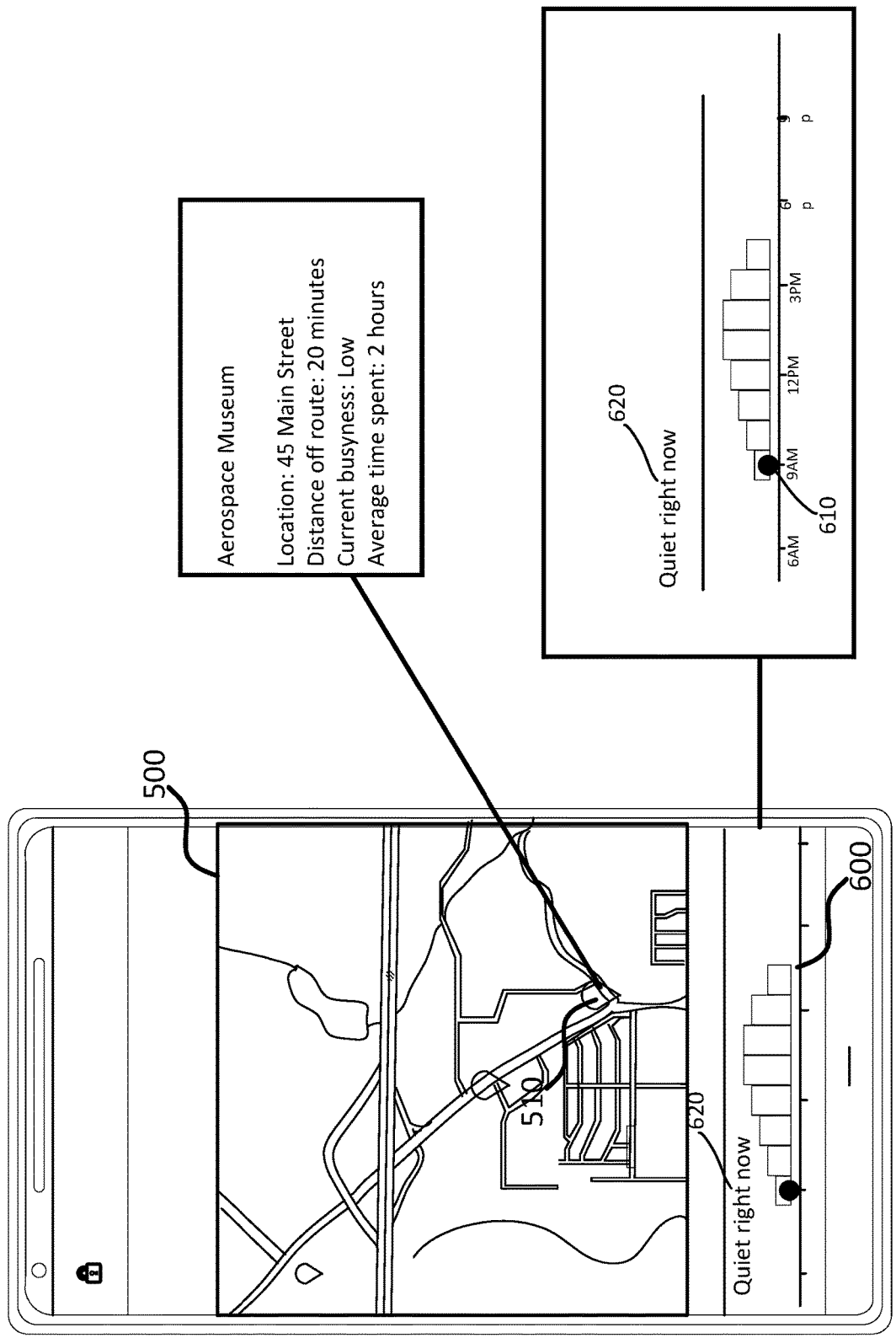
FIG. 6 illustrates additional information associated with a particular candidate POI according to aspects of the disclosure.

FIG. 6 shows an example of busyness for the POI 510. According to some examples, the busyness can be displayed as a chart 600 in relation to a map 500 used in the navigation. The busyness of the POI 510 can refer to one or more metrics measuring the activity at the POI 510. One such metric can be a ratio between the capacity and occupancy of the POI. Other metrics can include historical data about past levels of occupancy aggregated at different points in time, such as in days of the week or hours of a day.

A ratio between current capacity of the POI over the occupancy can be represented as $$\frac{(capacity - occupancy)}{capacity}.$$

For example, if the capacity for a POI is 100, and the current occupancy is represented as a positive integer n, then the ratio formed can be represented as $$\frac{(100 - n)}{100}.$$

A ratio closer to zero can indicate that the POI is close to capacity with many people, while a ratio closer to one can represent that the POI is relatively empty/with fewer people. Where the ratio is closer to one, new customers may be considered more valuable, and therefore the POI may move higher in rankings for content delivery. Additionally or alternatively, a cost per conversion may be higher when the ratio is closer to one than when the ratio is closer to zero. According to other examples, a ratio closer to zero may indicate that the POI is relatively popular, and therefore is a desirable place and should be ranked higher for that reason.

The busyness may vary over a span of time. Accordingly, the busyness may indicate a level of current busyness relative to other times of the day. For example, as shown in FIG. 6, the candidate POI 510 is relatively quiet at 9 AM, but is expected to become busier later in the day. In factoring busyness to the consideration of which content to deliver, candidate POIs with lower levels of current busyness may be ranked higher than those with higher levels of current busyness.

Balancing the user preferences and available timing against the candidate POI information, one or more candidate POIs may be selected for content delivery. The balancing and selection may include assigning weights to various factors such as location, type of POI, average time spent, busyness etc. The weights may be assigned based on any of a number of factors, such as user preference, an amount of content already delivered to the user, a time of day, or any other information. The balancing and selection may further include ranking candidate POIs, for example, based on the assigned weights. Accordingly, a candidate POI having a highest rank may be selected for delivery of audio content relevant to the selected POI at safe times during navigation.

The weights for applying to the POIs in the predetermined range can be generated according to a variety of different statistical analyses and/or machine learning techniques. As part of generating the weights, the system can preprocess the received signals and scheduling information to obtain a plurality of features, each feature directly or indirectly corresponding to some characteristic of the user and/or the POI. A feature can be represented in a variety of different ways, for example as a vector or array of numerical or categorical elements. The system can generate features as a function of different input features, for example to generate more complex representations of the input data.

The system can perform feature generation and/or feature selection using one or more rules or heuristics, for example that specify that certain data is more or less relevant to the final determination of weighting a POI. In other examples, feature selection and generation can be performed as a product of statistical analysis and/or machine learning.

The system may be configured to process the features and information related to the POIs to determine a respective weight for each POI. As an example, the content delivery module 102 (FIG. 1) can process the data through a machine learning model such as a neural network. The neural network can be trained to receive the features and the POI information, and generate a vector or some other data structure of weights corresponding to the predicted ranking of relevancy for the user for the input POIs.

The neural network can be trained from training data representing user signals for a particular user and their scheduling information, labeled with the user's preference of POIs, for example as a ranked list. An error function for the neural network during training can be a measured distance between the output of a training example generated by the neural network, with the ground-truth represented by the label for the training example. The resulting error can be back-propagated through the neural network, for example with stochastic gradient descent. Training can continue on individual training examples and/or batches of examples. Training can continue until some condition is met, for example after a set number of iterations or amount of time has passed, and/or when the average error measured between network output and a respective ground-truth value falls within a predetermined threshold.

Although described with the example of a neural network, other model architectures can be used, such as regression models, or decision trees. In some implementations, the system can process the data through models trained using unsupervised learning techniques, such as through clustering or principal component analysis. The model or models used by the system can be trained by a model training module specially configured for model training and retraining. The model training module can be implemented as part of the server computing device 115, which can be configured to receive training data as described herein for training the model or models used by the content delivery module 102. In some implementations, a model training module implemented on the server computing device 115 or another device coupled to the server computing device 115 can be configured to periodically retrain or tune one or more models. For example, the model training module can be configured to periodically perform a training process as described herein once a week, using new training data collected by the server computing device 115, such as from user feedback indicating certain preferences they had for some POIs recommended over others.

Figure 7A:
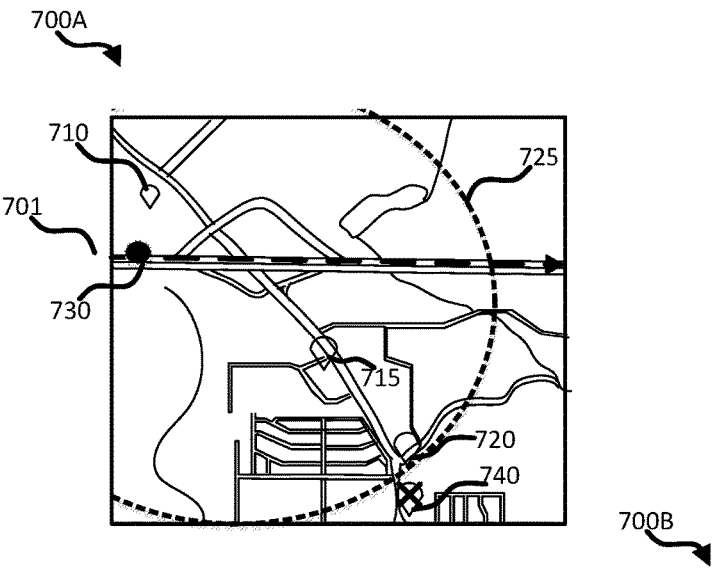
FIGS. 7A-C illustrate evaluation of various candidate POIs for content delivery according to aspects of the disclosure.
Figure 7B:
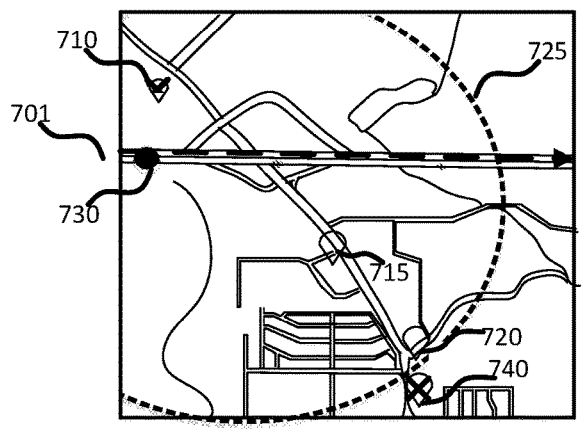
Figure 7C:
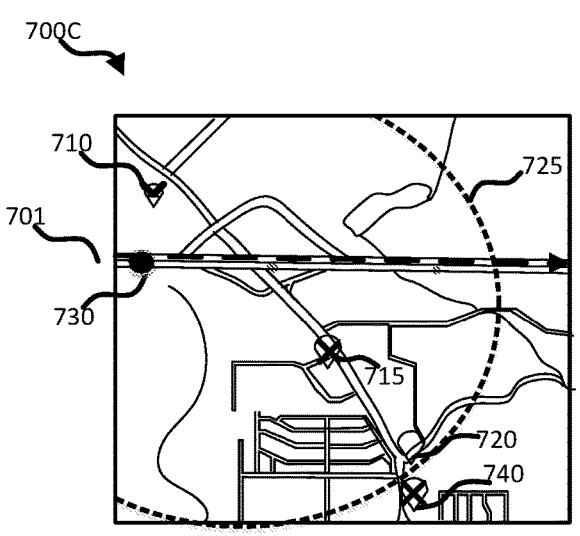

FIGS. 7A-C illustrates an example of evaluating candidate POIs for presenting content relevant to a selected POI through a user computing device. It should be understood that this is merely one example of how evaluation can be performed, and that the system can rank and determine which POI to deliver content for according to various determinations in different orders and performed in different ways.

Maps 700A-C show a predetermined range 725, a route 701, a current location 730 of a user computing device, and POIs 710, 715, 720, and 740. Also in FIGS. 7A-C and as described herein, some POIs are shown with an "X" to represent that the POI has been removed from consideration as a POI for which content is delivered to the user computing device at the current location 730.

In FIG. 7A, POI 740 is removed from consideration by the content delivery module 102, because the POI 740 is not within the predetermined range 725.

In FIG. 7B, POIs 710 and 740 are shown as removed from consideration by the content delivery module 102. The content delivery module 710 may remove the POI 710 after balancing user preferences and POI information as described above and determining a ranking among the POIs 710-720. The content delivery module 102 can rank the POI 710 low if it is predicted to be of low relevance to the user. For example, the POI 710 may be a hardware store, while the POIs 715-720 may be restaurants. Based on historical data for the user and according to techniques described herein, the system can predict that the user is more likely to consider a restaurant than a hardware store as an intermediate destination during a trip, and rank the POIs in a corresponding fashion.

In FIG. 7C, POIs 710, 715, 740 are shown as removed from consideration. The system can determine that the remaining POI 720 is the POI to deliver content for according to the scheduling information, the estimated time of arrival to the final destination, and the total detour time for the POI 720.

For example, although both POIs 715, 720 are ranked high for relevancy by the content delivery module 102, given the total detour time for each POI, the content delivery module 102 can determine that the user of the user computing device at the current location 730 may only have time to sit and eat at the POI 720. The content delivery module 102 can make a determination to deliver content for POI 720 on this basis even though POI 720 appears to be physically farther from the user computing device than the POI 715.

One reason for selecting POI 720 over POI 715 can be because the average time spent at the POI 715 may be much longer than the average time spent at the POI 720, which can affect the respective total detour times for each POI. As a result, although the POI 715 is physically closer to the user computing device at the current location 730, the content delivery module 102 determines that the user has availability for only the POI 720, at least in part because the average time spent at the POI 720 can be much lower than the POI 715 and contribute to an overall lower total detour time.

Determining a Timing to Present Content

In addition to determining which POIs within the predetermined range of the user computing device are relevant to the user, the system can also determine the timing at which to present content related to the identified POIs. Determining a proper timing for content presentation can involve determining when the content is safe to output to the user.

The system may be configured to present the content to the user only during times that are predicted to not distract the user from walking or operating a vehicle in a safe manner. The determination of a proper timing for safe delivery may be context-based and related to the time and location of the user computing device. The system can continuously make determinations as to safe timings for content presentation in real-time, to reflect the constant changes to different conditions that could potentially require heightened user attention. These conditions can include traffic, the presence of pedestrians, weather patterns, or time-of-day, as examples. For example, the system can be configured not to output content through the user computing device during a predetermined period of time before a navigation instruction is expected to be given. The period of time can be determined, for example, based on the speed at which the user computing device is moving. As the measured speed of the user computing device increases, the period of time during which content is not presented through the device before a navigation instruction is given can also be increased. As a result, the system is able to dynamically adjust the period of time in which content is prohibited from being output, based on the speed of the user computing device. This dynamic adjustment further improves safety as content is provided less often when the user is travelling more quickly. This allows the user greater periods of uninterrupted time for performing safe navigation activities.

The dynamic adjustment of content delivery can be achieved in various manners other than based on the speed of travel. As another example, the system can be configured not to present content when the user computing device is detected to be in a high traffic area, such as a busy intersection with passing pedestrians, or stop-and-go traffic conditions near a car accident. As another example, certain locations in which difficult traffic maneuvers are expected to be performed can also be marked as a region in which the system does not provide content. Unprotected left-hand turns, for instance, can be an example of a difficult traffic maneuver.

In some implementations, the system can also determine not to present content when the user computing device is detected to be traveling along a route at a certain time of day and/or under adverse weather conditions. For example, the user computing device can be configured not to present content when it is detected to be in a region going through a major snow storm, so as to not distract the user as they navigate/operate a vehicle through the snow storm. Another example is reducing or preventing the presentation of content at night when it may be more difficult to navigate/operate a vehicle.

The system can also be configured with rules and/or heuristics indicating times and locations at which presented content is likely not to distract the user of the user computing device. For example, a long stretch of highway with several minutes before the next navigation instruction can be set as a rule or heuristic for a time to present content without distracting the user. In other words, a predetermined rule may be set based on a time until the next navigation instruction. If the time until the next navigation instruction exceeds a threshold, the system may choose to present content. Conversely, if the time until the next navigation instruction is under a particular threshold, the system may choose to not present content. In addition or alternatively, the system can access traffic data characterizing the flow or volume of traffic, and determine that it is safe to present content based on the flow or volume of traffic. For example, if the user device is moving below a threshold speed, indicative of or as a result of heavy traffic, it may be determined that it is safe to provide content. An example of such content may be an advertisement for a POI that the user can visit during an expected period of traffic, such that the user can avoid the traffic by instead visiting the POI.

In some implementations, the user computing device 110 and/or the server computing device 115 can implement one or more machine learning models or other statistical techniques for receiving traffic data, and predicting regions in which high user attentiveness is required. As part of determining these regions, the server computing device 115 and/or the user computing device 110 can receive historical data of traffic accidents at a particular location, and associate the location as a region for not providing content when the user computing device 110 is currently located in the region.

Presenting Content and User Interaction

The system may be interactive, and may provide for a simple hands-free response by the user to engage the content or decline it. For example, if the relevant POI is a stamp store, the content delivered can be speech such as: "There is a shop selling collectable stamps nearby! It's called Stamps Store and it's only 3 miles away. If you visit this shop for 15 minutes, you will still arrive to your appointment 15 minutes early. Would you like to change your route to check out this store? Say 'yes' to make the routing change, or say 'no' to decline."

In the above example, the system provides content for a POI relevant to the user and also indicates a suggested time to visit the shop (15 minutes), as well as a confirmation that the user will still arrive at their appointment early. The system is configured to receive speech input from the user in response to the presented content, and add the POI as an intermediate destination at the user's request.

Also in the above example, if the system receives input indicating that the user has declined the offer, then the system can further prompt the user for other preferences, such as to reduce, stop, or mute content presentation for a particular POI, type of POI, or POIs in general. In addition or alternatively, the system can prompt the user, for example as a spoken question, whether the user has preferences for receiving content related to other types of POIs. The system is configured to factor in the user's spoken preference in ranking different nearby POIs for relevancy.

In some implementations the system is configured to determine relevant POIs that the user has availability to visit in response to a command from the user. For example, the system can receive speech input, and can be configured to process the speech input to recognize that the input is a command. The system can process the command to determine it is a command requesting suggestions for places to eat, for example. In response, the system can determine POIs within the predetermined range, determine which POIs are of restaurants or of places where food can be purchased, and weight each POI by predicted user relevancy. The system can then present content related to a relevant POI to the user that the system predicts can be visited without causing the user to be late to their destination.

In some examples, if multiple relevant POIs can be visited, the system may provide options to the user, for example as speech output: "There are two restaurants along the way, with an average seating time of 45 minutes. Restaurant A serves traditional American cuisine, while Restaurant B is a pizzeria. Would you like to hear more or make a reservation at one of those restaurants?" The system can then receive speech input and determine whether the input indicates that the user is interested in one of the listed restaurants, and whether they would like to make a reservation. In some implementations, the system is in communication with one or more other modules or devices that are configured to automatically make a reservation at the restaurant selected by the user.

Processing User Feedback:

The server computing device 115 (FIG. 1) can receive user feedback in a variety of different ways. One source of user feedback can be conversion data recorded that represents actions taken by the user after content is provided. Generally, actions taken to accept the content and/or to engage with the POI that is the subject of the content can be a positive indication that the content and POI was relevant to the user. A model trainer training the models can take the user feedback and generate labels for feature data corresponding to the user from which the feedback was obtained.

Actions by the Guided Navigation System after Content Delivery:

In some examples, after content is presented to the user, the system may enter a "cooldown" period before presenting additional content. The cooldown period can be predetermined, for example set to at least thirty minutes between different content presented to the user. The system can be configured to receive input representing user preferences, for example to set the cooldown period to a longer or shorter time. The system may also be configured to receive input from the user, for example through speech or touch input on a user interface, to not present content at all, or to only present content for certain types of POIs, such as restaurants.

According to some examples, the system can be configured to keep track of changes to the route in real-time, and relay that information to the user while the user computing device is located at the POI. The system can send reminders, such as textual or audio notifications, reminding the user of how much time they have left at the POI before they should get back on route. For example, the system may provide an indication to the user of how much time is remaining for the user to spend at the POI before the user should return to the route to avoid being late to the destination. The time remaining may include allot a few extra minutes for the travel time as a buffer.

In some examples, traffic or street conditions may change while the user is still at the POI. In those examples, the system can be configured to calculate updated routes, according to techniques described herein. If the system predicts a new estimated time of arrival that requires that the user return to the route sooner than the total detour time previously calculated for visiting the POI, then the system can cause the user computing device to output a text or audio notification indicating the change in route.

Monetization Arrangements Based on Conversions to Recommended POIs

Entities associated with different POIs providing content for delivery through a navigation system can do so according to different financial arrangements based on conversion data. Rich conversion data can be available to the navigation system described herein and can be directly attributed to content presented to the user. The conversion data can be used as part of a monetization scheme in which different actions are recorded as being performed by the user, such as expressing interest in a POI, visiting a POI, or purchasing something from the POI. Data representing these actions taken can be monetized, such as by the server computing device, as value added to the POI. According to some aspects, conversion data can be granular enough to distinguish between a visit to the POI, and a purchase at the POI. It may additionally or alternatively factor an amount of time spent at the POI. In turn, the entity associated with the POI can be charged some amount of money as a function of the nature and quantity of conversion data attributed to content presented to the user. In this way, aspects of this disclosure provide for a more nuanced scheme for compensation to more accurately reflect value added to the POI from the presented content.

Example monetization schemes follow. In one example, an entity for a POI is charged for content related to the POI that was presented and responded to by the user. For example, if the user agrees to add the POI as an intermediate destination, then the server computing device can collect that confirmation as part of conversion data. The server computing device can also send a charge to the entity associated with the POI according to some predetermined rate.

As another example, the entity associated with the POI may be charged as a function of signals received by the user computing device indicating that the user visited the POI after the content was presented. The signals can be received according to any communication medium and any suitable format, such as GPS coordinates, or a social media "check-in" at a location.

As another example, the entity associated with the POI may be charged depending on whether the user purchased goods or services while at the POI. For example, the server computing device can be configured to, or coupled to one or more other devices configured to, manage financial transactions performed by the user over a specific platform and/or application. The server computing device can be configured to charge a flat rate to the entity in response to a purchase, or a percentage rate of whatever the total transaction value was recorded at the POI, or another rate. As another example, the entity associated with the POI can be charged a fixed amount for each time content related to the POI is presented to a user.

In another example monetization scheme, the entity associated with a POI can be charged a marginal rate as a function of how busy the POI is predicted to be at the time the user visits. As described above, the system may determine a ratio between capacity of the POI and its current occupancy. The marginal rate can be directly related to the ratio. For example, the system may charge more per-user visiting the POI when the ratio is closer to zero, and may charge less per-user visiting the POI when the ratio is closer to one. In some implementations, the monetization schemes can combine different examples as described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
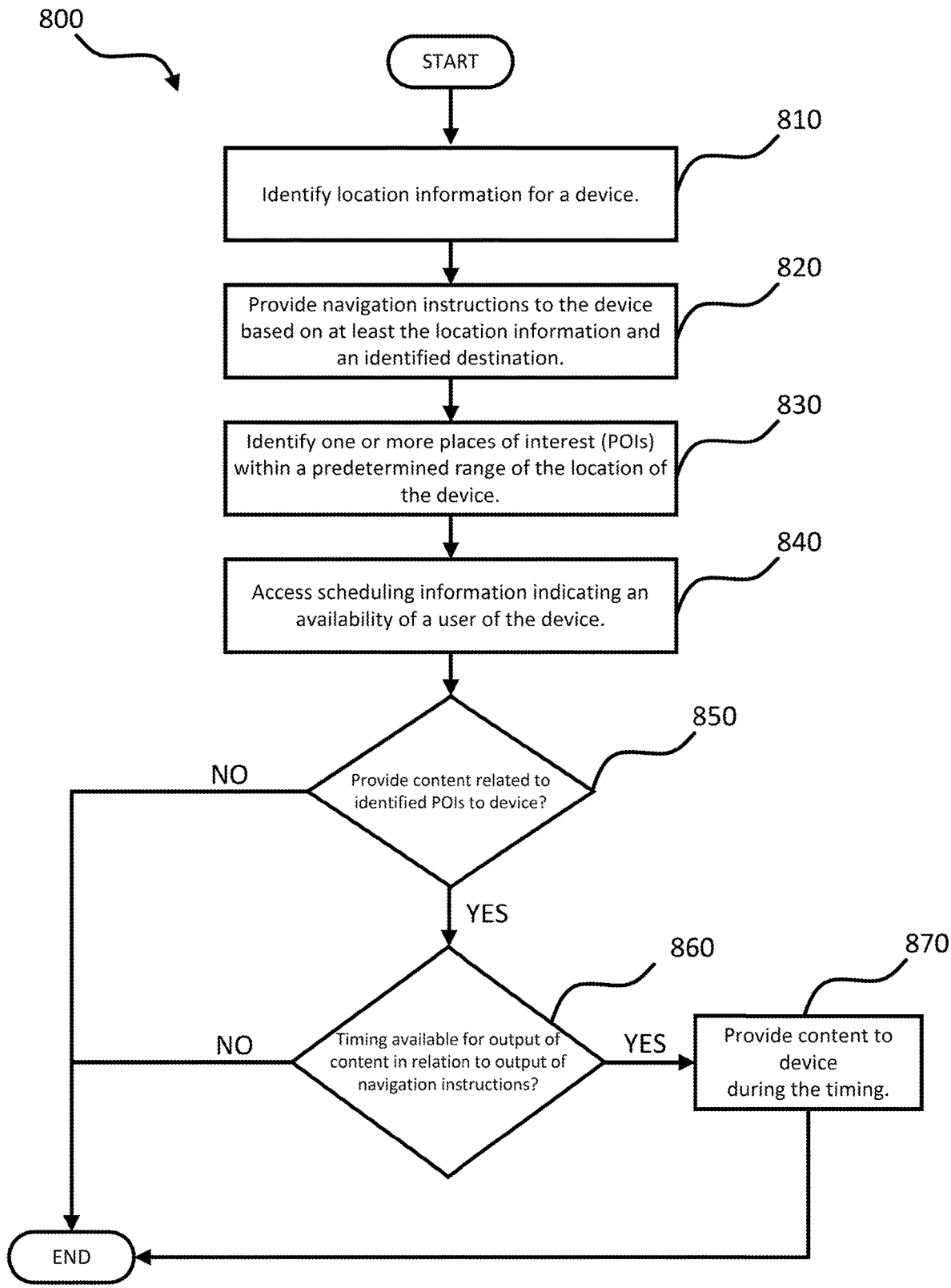
FIG. 8 is a flow diagram of an example process for context-based content-driven guided navigation according to aspects of the disclosure.

FIG. 8 is a flow diagram of an example process 800 for a context-based content-driven guided navigation. The process 800 is described as being performed by a computing device implementing a guided navigation system, configured in accordance with aspects of this disclosure. For example, referring back to FIG. 1, the client computing device 110 and/or the server computing device 115, appropriately configured, can perform the process 800.

In block 810 of FIG. 8, the computing device identifies location information for a user computing device. In some implementations, the computing device is the user computing device itself, while in other implementations the computing device can be a server computing device coupled to a user computing device and configured to receive location information, such as GPS coordinates.

In block 820, the computing device provides navigation instructions to the user based on at least the location information and an identified destination. The navigation instructions can be generated in a variety of different ways and according to any of a variety of known techniques. A user computing device can generate the navigation instructions, for example through a navigation module of a guided navigation system. In some implementations, the user computing device can transmit location information and a desired destination to one or more server computing devices configured to generate navigation instructions and provide those instructions back to the user computing device.

In block 830, the computing device identifies one or more POIs within a predetermined range of the location of the user computing device. In block 840, the computing device accesses scheduling information indicating an availability of a user of the user computing device. The scheduling information can be accessed in response to permission obtained by a user of the user computing device. The scheduling information can include deadlines, appointments, and other time-sensitive obligations of the user.

In block 850, the computing device determines whether to provide content related to the identified POIs to the user computing device. If the computing device determines not to provide content, then the process 800 ends. Otherwise, if the computing device determines to provide content related to the identified POIs, the process 800 proceeds. The determination to provide content can include determining whether the content is relevant to the user based on a variety of different signals related to the user and/or POIs within the predetermined range of the user computing device. The computing device can determine a total detour time for visiting a POI that factors in the travel time to and from the POI relative to the current route, as well as the average length of stay or visit for different data-providing users.

In block 860, the computing device determines whether there is a timing available for output of the content in relation to output of the navigation instructions. F content delivery module for a computing device can be configured to identify a proper timing to present content, for example in relation to the next navigation instruction, and/or in relation to particular locations identified as being regions in which high attention is predicted to be required by the user to safely navigate through the region.

If the computing determines a timing for outputting the content, in block 870 the computing device provides content to the device during the timing. Otherwise, the process 800 ends.

The subject matter described in this specification can be implemented so as to realize one or more of the following advantages or technical effects. A guided navigation system can adjust a route between an origin and a destination in a context-based content-driven manner. Content related to one or more places of interest (POIs) can be identified by the guided navigation system not only according to a predicted relevance of the POI to a user, but also based on a determination that the user has availability to visit the POI without causing the user to be late in arriving at their destination.

POIs can be automatically filtered out, for example, based on predicted detour times to visit the POIs that would cause a user of a device implementing the guided navigation system to be late to their destination. For example, the filtered POIs can be omitted from display on the map, thereby reducing clutter on the displayed map. As another example, such filtered POIs may simply be omitted from consideration for delivery of content. The guided navigation system can automatically predict a detour time to visiting a POI, based at least on scheduling information provided by the user and aggregated data representing an average length-of-stay of users at the POI. Relevant content can be delivered faster, at least because the guided navigation system can filter a list of potentially relevant POIs within a predetermined range of the user computing device, at least by whether or not the guided navigation system predicts that the user has availability to visit those POIs with arriving late at their ultimate destination.

In addition, the guided navigation system can provide for presenting relevant content to a user according to predicted timings during which the presented content is not predicted to distract the user from navigating to their destination, for example by car, by foot, or by other forms of transportation. Accordingly, the system described herein provides for safe and effective communication of content.

Conversion data representing user actions performed in response to receiving content can be easily measured and directly attributed to the presented content. Aspects of this disclosure allow for using the conversion data as a real-time feedback system for improving the accuracy of relevant content predictions by the guided navigation system. The conversion data can also be used for managing monetization schemes for entities providing content related to different POIs to be distributed by one or more devices coupled to the guided navigation system of the user computing device. Added value from the relevant and properly timed content can be easily measured by corresponding conversation data collected from the user with their consent, and the conversation data can be used to drive corresponding compensation from the entities associated with the POIs as a result of the value added to their POIs by visiting users.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

A computer program can be written in any type of programming language, and according to any programming paradigm, e.g., declarative, procedural, assembly, object-oriented, data-oriented, functional, or imperative. A computer program can be written to perform one or more different functions and to operate within a computing environment, e.g., on a physical device, virtual machine, or across multiple devices. A computer program can also implement functionality described in this specification as performed by a system, engine, module, or model.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:

identifying, by one or more processors, location information for a computing device;

providing turn-by-turn navigation instructions to the computing device based on at least the location information and an identified destination;

identifying, by the one or more processors, one or more places of interest (POIs) within a predetermined range of the location of the computing device;

accessing, by the one or more processors, scheduling information indicating an availability of a user of the computing device;

receiving, by the one or more processors, features and information related to the identified one or more POIs;

determining, by the one or more processors executing a machine learning model, respective weights for the identified one or more POIs based on the features and information related to the identified one or more POIs and relevance to the user;

selecting, by the one or more processors, a POI of the identified one or more POIs based on the respective weights;

providing, based on at least the scheduling information, content to the computing device for output, the content related to the selected POI of the identified one or more POIs, wherein the content is provided to the computing device during a stretch of time before a next navigation instruction that meets a threshold amount of time;

receiving, by the one or more processors, real-time feedback from the user in response to the output;

updating the machine learning model, based on the real-time feedback, for subsequent selection of subsequent POIs; and after providing the content, entering a cooldown mode for a predetermined period of time, wherein during the cooldown mode additional content related to the selected POI is not displayed to the computing device.

2. The method of claim 1, wherein the content is provided to the computing device at a timing before a next navigation instruction is to be performed.

3. The method of claim 1, wherein providing, based on at least the scheduling information, the content to the computing device further comprises:

calculating a total detour time for visiting the selected POI related to the content;

calculating, from the total detour time and a current estimated time of arrival to the destination, an updated estimated time of arrival; and determining, based on the updated estimated time of arrival and the scheduling information, whether the user has availability to visit the selected POI.

4. The method of claim 3, wherein calculating the total detour time comprises:

estimating an amount of time required to travel to the selected POI and return to an original route;

receiving information corresponding to an average length of visit to the selected POI; and adding the estimated amount of time with the average length of visit to the selected POI.

5. The method of claim 4, wherein receiving information corresponding to the average length of visit to the selected POI is based on historical data from a plurality of mobile devices that have visited the selected POI.

6. The method of claim 4, wherein the selected POI is one of a plurality of POIs of a particular category of POIs, and wherein the method further comprises:
receiving one or more user signals characterizing length of visits by the user to one or more of the plurality of POIs of the particular category; and
updating the average length of visit to the selected POI based on at least the one or more user signals.

7. The method of claim 3, wherein the method further comprises:
determining that the computing device is currently located at the selected POI; and
sending data to the computing device suggesting time remaining for the length of visit at the selected POI based on the scheduling information.

8. The method of claim 1, further comprising updating a navigation route in real time to provide directions to selected one of the one or more POIs.

9. The method of claim 1, wherein the selected POI is a restaurant, store, or service location.

10. A computing device comprising one or more processors, wherein the one or more processors are configured to:
identify location information for the computing device;
receive turn-by-turn navigation instructions based on at least the location information and an identified destination;
identify one or more places of interest (POIs) within a predetermined range of the location of the computing device;
access scheduling information indicating an availability of a user of the device;
receive features and information related to the identified one or more POIs;
determine, executing a machine learning model, respective weights for the identified one or more POIs based on the features and information related to the identified one or more POIs and relevance to the user;
select POI of the identified one or more POIs based on the respective weights;
provide, based on at least the scheduling information, a content to the computing device for output, the content related to the selected POI of the identified one or more POIs, wherein the content is provided to the computing device during a stretch of time before a next navigation instruction that meets a threshold amount of time;
receive real-time feedback from the user in response to the output;
update the machine learning model, based on the real-time feedback, for subsequent selection of subsequent POIs; and
after providing the content, enter a cooldown mode for a predetermined period of time, wherein during the cooldown mode additional content related to the selected POI is not displayed to the computing device.

11. The computing device of claim 10, wherein the content is provided to the computing device at a timing before a next navigation instruction is to be performed.

12. The computing device of claim 10, wherein the one or more processors are further configured to:
calculate a total detour time for visiting the selected POI related to the content;
calculate, from the total detour time and a current estimated time of arrival to the destination, an updated estimated time of arrival; and
determine, based on the updated estimated time of arrival and the scheduling information, whether the user has availability to visit the selected POI.

13. The computing device of claim 12, wherein the one or more processors are further configured to:
estimate an amount of time required to travel to the selected POI and return to an original route;
receive information corresponding to an average length of visit to the selected POI; and
add the estimated amount of time with the average length of visit to the selected POI.

14. The computing device of claim 13, wherein the one or more processors are further configured to receive an average length of visit to the selected POI based on historical data from a plurality of mobile devices that have visited the selected POI.

15. The computing device of claim 13, wherein the selected POI is one of a plurality of POIs of a particular category of POIs, and wherein the one or more processors are further configured to:
receive one or more user signals characterizing length of visits by the user to one or more of the plurality of POIs of the particular category; and
update the average length of visit to the selected POI based on at least the one or more user signals.

16. The computing device of claim 12, wherein the one or more processors are further configured to:
determine that the computing device is currently located at the selected POI; and
send data to the computing device suggesting time remaining for the length of visit at the selected POI based on the scheduling information.

17. The computing device of claim 10, wherein the selected POI is a restaurant, store, or service location.

18. A non-transitory computer readable medium storing instructions executable by one or more processors for performing a method comprising:
identifying location information for the computing device;
receiving turn-by-turn navigation instructions based on at least the location information and an identified destination;
identifying one or more places of interest (POIs) within a predetermined range of the location of the computing device;
accessing scheduling information indicating an availability of a user of the computing device;
receiving features and information related to the identified one or more POIs;
determining, executing a machine learning model, respective weights for the identified one or more POIs based on the features and information related to the identified one or more POIs and relevance to the user;
selecting one of the identified one or more POIs based on the respective weights;
providing, based on at least the scheduling information, a content to the computing device for output, the content related to a selected one of the identified one or more POIs, wherein the content is provided to the computing device during a stretch of time before a next navigation instruction that meets a threshold amount of time;
receiving real-time feedback from the user in response to the output;
updating the machine learning model, based on the real-time feedback, for subsequent selection of subsequent POIs; and
after providing the content, entering a cooldown mode for a predetermined period of time, wherein during the cooldown mode additional content related to the selected POI is not displayed to the computing device.

19. The non-transitory computer-readable medium of claim 18, wherein the content is provided to the computing device at a timing before a next navigation instruction is to be performed.

* * * * *